Patented Apr. 1, 1941

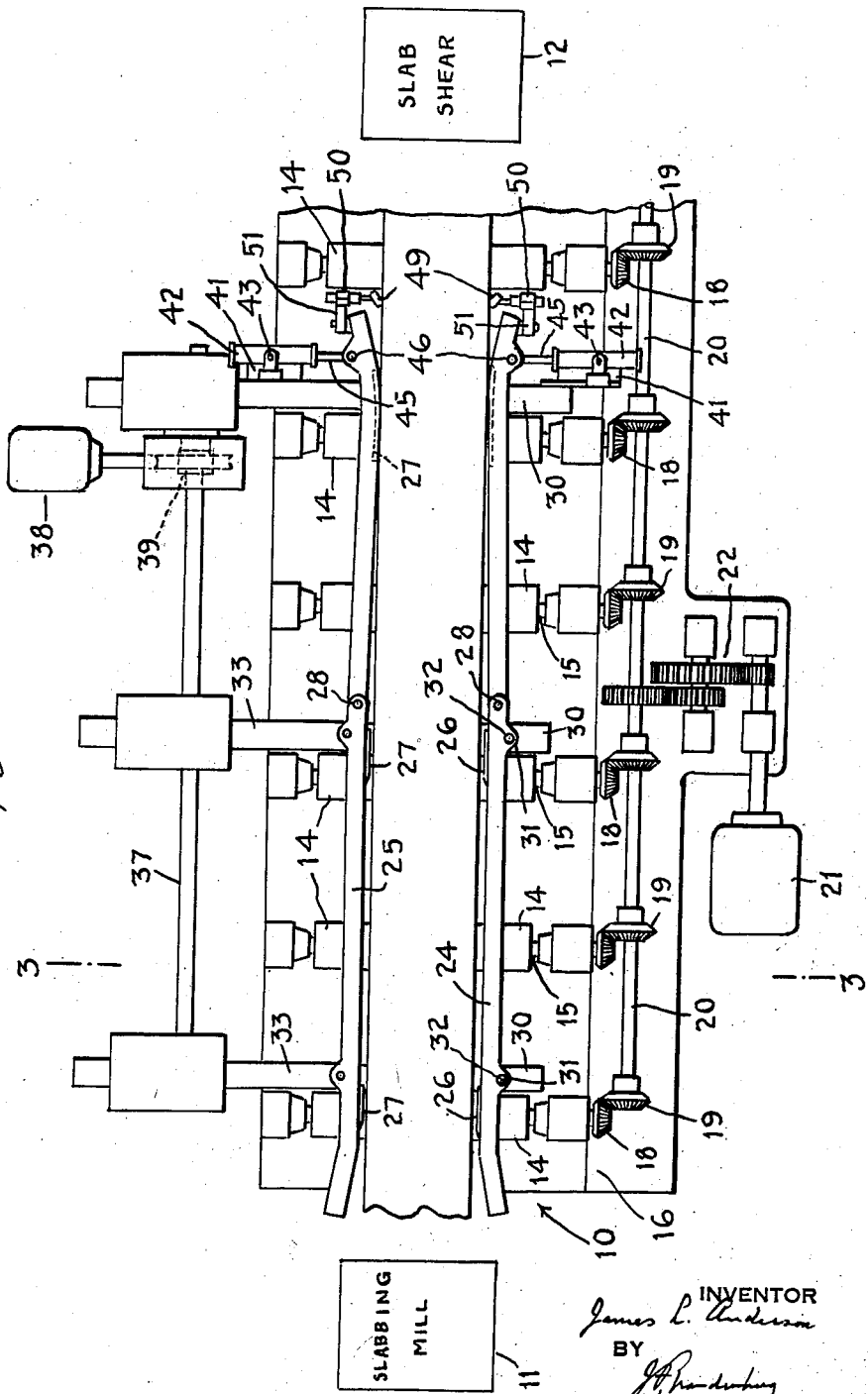

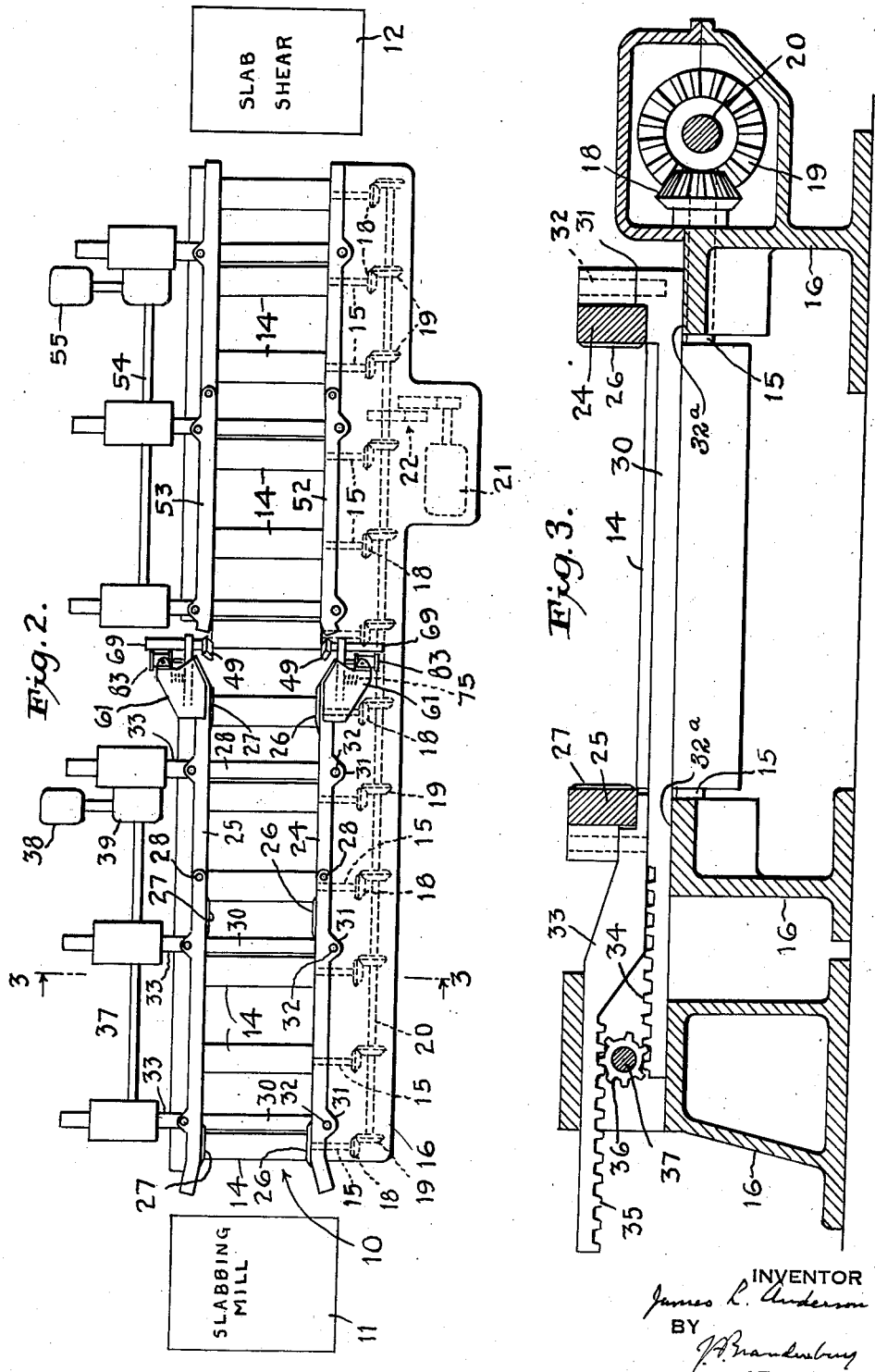

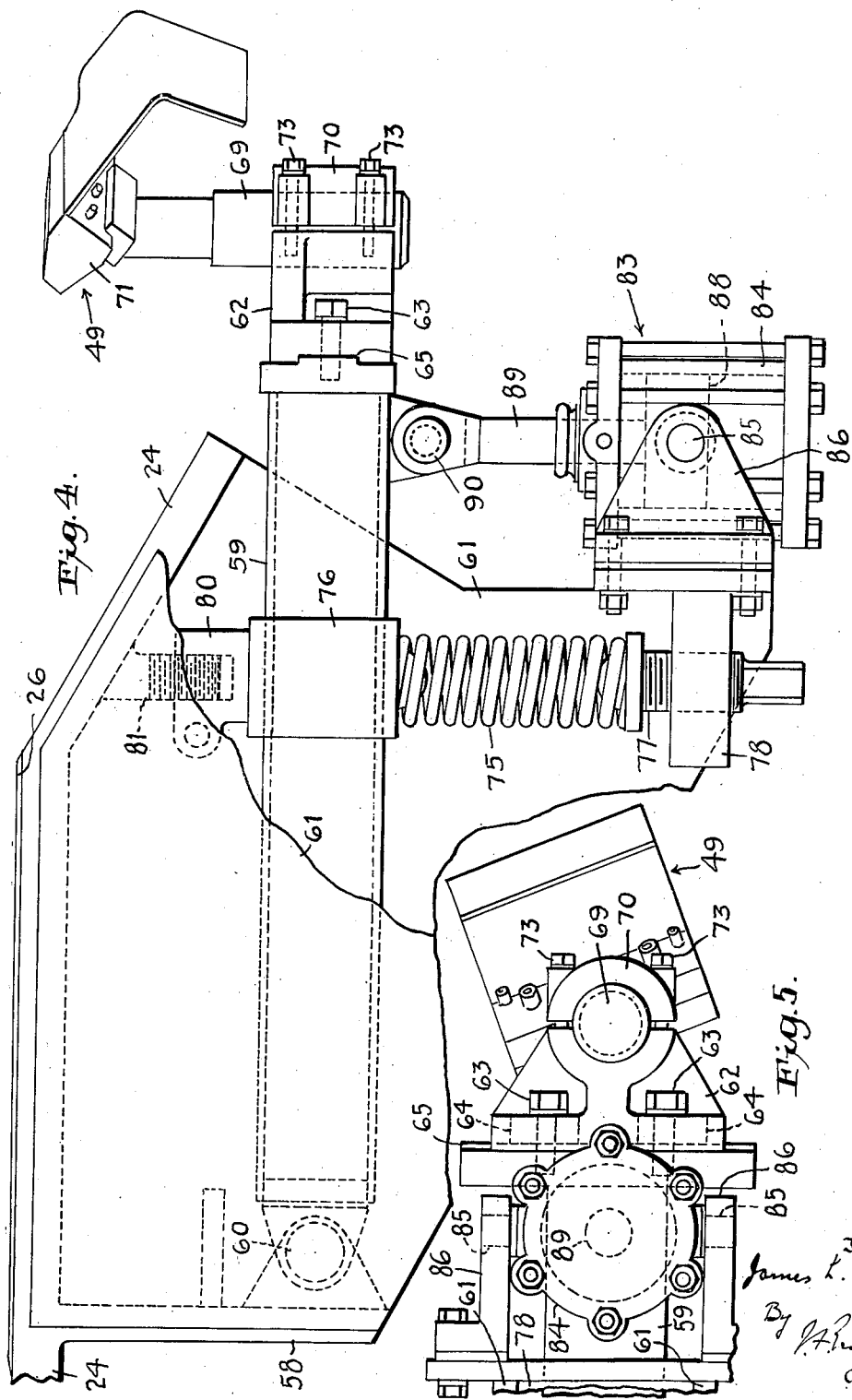

2,236,743

UNITED STATES PATENT OFFICE 2,236,743

APPARATUS FOR SCARFING THE SIDES OF METAL BODIES

James L. Anderson, Closter, N. J., assignor to Air Reduction Company, Incorporated, New York, N. Y., a corporation of New York Application April 12, 1939, Serial No. 267,517

13 Claims. (Cl. 266—23)

This invention relates to scarfing or removal of surface metal from the sides of metal bodies such as ingots, blooms, slabs, billets, or similar bodies. More especially, the invention relates to apparatus for removing the surface metal from a slab or other metal body as it travels along a conveyer or run-out table between a rolling mill and shear, or between other regions of treatment.

Surface imperfections such as seams, blisters, scabs, and breaks in the faces of a slab or other metal body, from which plates or sheets are to be rolled, produce defects in the final rolled product. One way in which such surface defects are eliminated is by scarfing the metal body and with such treatment removing the surface metal, in which the imperfections occur, by means of oxygen streams directed at an acute angle against the heated surface of the body.

In the case of slabs, imperfections like breaks or seams, are often deeper in the side faces than in the top and bottom surfaces. This is because the rolling to which the metal is subjected in producing a slab tends to elongate and deepen the cracks in the side edges while increasing the length and reducing the height of the sides of the metal body. The scarfing of the edge face of a slab, therefore, often requires the removal of a somewhat thicker layer of metal.

It is an object of this invention to provide improved apparatus for scarfing metal bodies. Another object is to combine the scarfing apparatus with the edge guides of a conveyer or mill run-out table in such a manner that adjustment of the guides for metal bodies of different width automatically adjusts the scarfing apparatus.

Although the invention will be described as applied to edge guides on a run-out table of a slabbing mill, with which it is particularly advantageous, the invention is not limited to such use, and features of the invention can be applied to other conveyers and to other scarfing apparatus.

Other objects, features and advantages of the invention will appear or be pointed out as the specification proceeds.

In the accompanying drawings, forming part hereof:

Fig. 1 is a top plan view, partly diagrammatic, showing a run-out table, between a slabbing mill and a slab shear, with edge guides on the table and scarfing apparatus connected to the edge guides.

Fig. 2 is a reduced top plan view similar to Fig. 1 but showing a modified form of the invention, and showing the run-out table with no slab on it.

Fig. 3 is an enlarged sectional view on the lines 3—3 of Figs. 1 and 2.

Fig. 4 is an enlarged view of the scarfing apparatus shown in Fig. 2.

Fig. 5 is a side elevation of the apparatus shown in Fig. 4.

A conveyer or run-out table 10, located between a slabbing mill 11 and slab shear 12, is made up of a number of rollers 14 which turn on parallel axles 15 journaled in a stationary frame 16. The table rollers 14 are rotated by bevel gears 18 secured to the axles 15. Each of the bevel gears 18 meshes with a similar gear 19 on a drive shaft 20 which is driven by an electric motor 21 through reduction gearing 22.

As each slab comes from the mill 11 it travels along the table 10 between edge or side guides 24 and 25. Since slabs are not all of the same width, the side guides 24 and 25 are adjustable toward and from each other. In order to prevent excessive wear the side guides 24 and 25 have hard surfaces 26 and 27, respectively, on their inside walls. The hard surfaces may extend for the entire length of the side guides, but that is not necessary. For each width slab the guides are first adjusted to leave enough clearance for the slab to run freely between the side guides, but the guides are close enough to keep the slab straight on the table. The slab is thereby kept in line for its entry into the slab shear 12, or into another rolling mill pass, as the case may be.

Each of the side guides 24, 25 is made in two sections that are joined by a pivot connection 28. After the spacing of the side guides 24 and 25 has been set to provide enough clearance for the free passage of a slab 29, the right-hand sections of the side guides are brought together until they bear against the sides of the slab, as shown in Fig. 1. The ends of the guides are curved to a large radius to increase the areas of contact with the slab.

The guide adjusting mechanism is shown in Figs. 1, 2 and 3. The right edge guide 24 rests on slides or cross members 30 and has ears 31 by which it is attached to the cross members 30 by pins 32. The cross members are supported by the stationary frame 16 and slide transversely of the table on bearings 32a on the frame. The left edge guide 25 is supported by and connected to slides 33 which bear against the top faces of the longer slides 30.

The slides 30 and 33 have racks 34 and 35, on their upper and lower faces, respectively, meshing with a pinion 36 on a shaft 37 which is driven by a motor 38 through reduction gearing 39. Rotation of the pinion 36 causes the slides 30 and 33 to move in opposite directions because the racks 34 and 35 mesh with the pinion on opposite sides. There is a pinion on the shaft 37 for each pair of slides 30, 33, and since all of these pinions turn in unison with the shaft 37 the edge guides are moved parallel to themselves whenever the shaft 37 is rotated.

The slides or cross members 30 and 33 at the right ends of the side guides are not connected directly to the side guides, but each slide carries a bracket 41 with a yoke in which a fluid motor 42 is supported by trunnions 43. Each motor 42 is preferably a double-acting air motor and includes a piston rod 45 which connects with one of the side guides 24, 25 through a pivot connection 46.

At their entrance end, where the slab or other metal body first comes between the side guides 24, 25, the guides are flared outward to allow for some error in the centering of the metal body. At the exit end of the side guides 24, 25 there is apparatus for removing the surface metal from both of the edge faces of the slab. This desurfacing or scarfing apparatus includes torches 49 held in split clamps 50 that are supported from the side guides 24 and 25 by brackets 51. Beyond the scarfing apparatus there may be other edge guides which will be described in connection with Fig. 2.

The scarfing torches 49 are adjusted in the split-clamp torch holders 50 so that when the right end sections of the side guides 24, 25 are in contact with the sides of the slab 29, the torches 49 are close to, but out of contact with, the surface of the slab. The torches 49 have preferably multi-jet block tips wide enough to direct a row of contiguous oxygen jets against the entire width of the slab edge when the tip is set at an angle that directs the gas streams not only at an inclination to the surface but also at an angle downward, with the horizontal and vertical components of the angle each of the order of 30°.

Beyond the side guides 24, 25 on which the scarfing torches are mounted, the mill run-out table 10 may have other side guides along the portion of the table that is beyond the torches 49. Fig. 2 shows side guides 52 and 53 beyond the torches, and these side guides are adjustable independently of the edge guides 24, 25, a separate drive shaft 54 and motor 55 being provided for the purpose. If it is desired to control both adjustments from a common control device, the shaft 37 may be coupled to the shaft 54 and one of the motors 38, 55 dispensed with.

The construction of the modified scarfing apparatus on the edge guide 24 of Fig. 2 is illustrated in detail in Figs. 4 and 5. That shown on the edge guide 25 is of similar construction, with the reversals necessary for the other side of the slab or other work-piece.

The end portion of the edge or side guide 24 in Fig. 2 has a rearwardly extending projection 58. A lever or arm 59 is connected to the projection 58 of the side guide 24 by a hinge or pivot 60. Cover plates 61 connected to the side guide 24 and its projection 58 form with those parts a housing that partially encloses the arm 59. There is a bracket 62 connected to the free end of the arm 59 by screws 63 that extend through slots 64 (Fig. 5) in the bracket and thread into the end of the arm. The bracket 62 is grooved to slide on a ridge 65 on the end of the arm and the ridge prevents the bracket from turning with respect to the arm 59.

The oxygen scarfing torch 49 has a stem 69 held in a split clamp 70 at the end of the bracket 63. The bracket, therefore, comprises the torch-holder for the scarfing apparatus. The torch has a multi-orifice block tip 71 which is secured to the stem 69 at such an angle that it directs oxygen streams against the edge surfaces of the slab at the desired inclination to the surface of the slab face.

In adition to the inclination of the oxygen streams with respect to the surface of the slab face, which inclination may be considered the horizontal component, the torch tip is tilted to give the oxygen streams a vertical component of inclination also as in the apparatus of Fig. 1. This vertical inclination directs the streams at an angle toward the lower edge of the slab face and the torch can be adjusted to change the vertical inclination of the streams by turning the stem 69 in the clamp 70 which is released by loosening clamping screws 73. The height of the torch can be adjusted to bring it even with the edge face of the slab by loosening the screws 63 and sliding the bracket 62 along the ridge 65. The bracket 51 in Fig. 1 may be provided with similar adjustments.

The arm 59 in Figs. 2 and 4 is urged inward by a pressure device that comprises a spring 75 compressed between a collar 76 on the arm and an adjusting screw 77 that threads through a lug 78 connected with the plate 61. The screw 77 is turned to vary the compression of the spring 75 and adjust the force with which the spring urges the collar 76 of the arm 59 against an adjustable limit stop or abutment which comprises a split nut 80 that threads on a stud 81 extending rearwardly from the back of the side guide 24.

The arm 59 is pulled back and held back against the pressure of the spring 75 by a fluid motor 83. The motor 83 has a cylinder 84 with trunnions 85 that turn in bearings in brackets 86 secured to the housing 58. There is a piston 88 in the cylinder 84, and a piston rod 89 is connected directly to the arm 59 by a pivot 90. As in the case of the motors 42 of Fig. 1, no connecting rod is necessary because the cylinder 84 oscillates on its trunnions 85 to accommodate itself to changes in the obliquity of the piston rod.

The arm 59 is pulled back against the pressure of the spring 75 by admitting working fluid under pressure behind the piston 88 of the motor 83. The control of fluid to and from such motors is well known and need not be described here for a complete understanding of this invention.

The motor 83 is operated to draw the arm 59 and torch 49 back when waiting for a slab to come down the mill table. After the slab end, which may be irregular, passes the torch 49 working fluid is released from the motor 83 and the spring 75 moves the arm 59 inward against the stop nut 80.

The nut 80 is adjusted so that it will stop the arm 59 when the tip 71 is in the desired position with respect to the side surface of a slab.

The preferred embodiments of the invention have been illustrated and described, but other embodiments can be made and some features of the invention may be used without others.

I claim:

1. The combination with a conveyer along which a metal body travels, of side guides extending lengthwise along the conveyer on opposite sides of the course along which the metal body moves, said guides being of substantial length to maintain the alignment of the metal body on the conveyer, and said guides being spaced apart for a distance at least as great as the width of the metal body, and scarfing apparatus carried by the side guides in position to operate on the side faces of the metal body as it travels along the conveyer.

2. The combination of a conveyer for metal bodies, side guides extending lengthwise along the conveyer, means for adjusting the side guides toward and from one another in accordance with the width of the metal bodies, said guides being of substantial length to maintain the alignment of the metal body on the conveyer, and scarfing apparatus connected to the side guides and movable with the side guides when said guides are adjusted toward and from one another to accommodate metal bodies of different width.

3. In a conveyer for metal bodies, guides extending lengthwise along the conveyer for limiting transverse movement of the metal bodies on the conveyer, said guides being of substantial length for holding the metal bodies straight as they travel along the conveyer, mechanism for moving the side guides toward and from one another to adjust their spacing in accordance with the width of the metal bodies, scarfing apparatus connected to the side guides and movable with the side guides when said guides are adjusted for metal bodies of different width, and means for changing the positions of the scarfing apparatus with respect to the side guides while the front end of a metal body is passing the scarfing apparatus.

4. In a conveyer for metal bodies, guides extending lengthwise along the conveyer for limiting transverse movement of the metal bodies on the conveyer, said guides being of substantial length for holding the metal bodies straight as they travel along the conveyer, mechanism for moving the side guides toward and from one another to adjust their spacing in accordance with the width of the metal bodies, said mechanism including a number of cross members attached to one of the side guides at a number of points along the length of that side guide, other cross members connected to the other side guide at spaced points along its length, racks on the cross members, a number of pinions meshing with the racks, the racks on the cross members from one side guide meshing with the opposite sides of the pinions from the racks on the cross members from the other side guide, and scarfing apparatus connected to the side guides and movable with the side guides when said guides are adjusted for metal bodies of different width.

5. The combination with a mill table having side guides for confining transverse movement of a metal body moving lengthwise along said table, means for shifting the side guides toward and from one another transversely of the table to accommodate said guides to metal bodies of different width, and scarfing apparatus connected to the side guides and movable with the guides when said guides are adjusted transversely, said scarfing apparatus including torches for directing oxygen streams against the opposite side surfaces of the metal bodies, adjustable limit stops on the side guides, and means for moving the torches with respect to the side guides including yieldable, pressure devices for holding the torches in contact with the limit stops while a metal body passes the scarfing apparatus.

6. In metal rolling apparatus in which a metal body from a rolling mill travels from a roll stand of said mill out over a run-out table that has side guides of substantial length for keeping the metal body straight and centered on the table as it travels lengthwise along said table, and in which there is mechanism for adjusting the side guides to accommodate metal bodies of different width, the combination with said side guides of scarfing apparatus connected to and adjustable with the side guides, said scarfing apparatus including torch means that deliver oxygen streams over the full height of the vertical faces of the metal bodies that come from the rolling mill.

7. The combination with a mill table between a slabbing mill and slab shear, of side guides of substantial length extending along the mill table for holding a metal body straight as it leaves the slabbing mill and approaches the shear, mechanism for adjusting the guides for slabs of different width, and torches connected to the side guides and adjustable with the side guides, said torches being constructed and arranged to direct oxygen streams against the side surfaces of the slab to remove the surface metal from the side faces of each slab as it passes along the table from the slabbing mill to the shear.

8. In a mill table having a side guide for holding a metal body to a given course, an arm hinged to the side guide for angular movement toward and from the side of a metal body moving along the table, a torch-holder on the arm for holding a scarfing torch in position to de-surface a side face of the metal body, a spring urging the arm in one direction and a motor for moving the arm in the other direction about the hinge connection to the side guide.

9. In a mill table having a side guide for holding a metal body to a given course, an arm hinged to the side guide for angular movement toward and from the side of a metal body moving along the table, a torch-holder on the arm for holding a scarfing torch in position to de-surface a side face of the metal body, an adjustable abutment that limits the movement of the arm toward the metal body, and means operatably connected with the arm including a spring and motor, one of which holds the arm against the adjustable abutment and the other of which retracts the arm for letting a flared end of a metal body pass the torch.

10. Scarfing apparatus including a guide for a moving metal body, an arm hinged at one end to the guide for angular movement toward and from the side face of the metal body as it passes along said guide, a bracket on the free end of the arm for holding a scarfing torch beyond the end of the guide, an abutment for preventing further movement of the arm toward the metal body after the torch reaches its operating position, and means for moving the arm on its hinged connection with said guide.

11. The combination with a mill conveyer for a metal body, of side guides for holding the metal body against lateral displacement or misalignment on the conveyer, scarfing apparatus on the side guides, mechanism for moving the side guides toward and from one another to accommodate metal bodies of different width, said mechanism including means for moving the side guides closest together at the regions of said scarfing apparatus.

12. In a conveyer for metal bodies, side guides along the conveyer for limiting transverse movement of the metal bodies on the conveyer and for holding the metal bodies straight as they travel along the conveyer, mechanism for moving the side guides toward and from one another to adjust their spacing in accordance with the width of the metal bodies, said mechanism including a number of cross members attached to one of the side guides at a number of points along the length of that side guide, other cross members connected to the other side guide at spaced points along its length, racks on the cross members, a number of pinions meshing with the racks, the racks on the cross members from one side guide meshing with the opposite sides of the pinions from the racks on the cross members from the other side guide, a rearward end portion on each side guide connected by a pivot connection with the forward portion of the side guide, scarfing apparatus connected to the rearward portions of the side guides and movable with the side guides when said guides are adjusted for metal bodies of different width, and mechanism for moving said rearward end portions of the side guides including other cross members, one for each side guide, operated by rack and pinion apparatus, common power means for operating all of the rack and pinion apparatus that adjusts the side guides, a fluid motor carried by each of said other cross members and operable to shift the rearward end portions of the side guides toward and from each other independently of the forward portions of the side guides.

13. Scarfing apparatus including torches on opposite sides of a metal body for removing the surface metal from the opposite side faces of the metal body while said body is moving along a conveyer, means connecting said torches with guides that extend lengthwise along the conveyer for holding the metal body in alignment as it travels along the conveyer, means for adjusting said guides toward and from one another for guiding metal bodies of different sizes, the connecting means for each torch including a link hinged to and extending beyond the end portion of its associated guide, devices for moving the links and torches that are on opposite sides of the metal body toward and from one another independently of the guides, and adjustable abutments for limiting the positions of the links as they move closer together, each of said devices including a spring urging the torch in one direction, and fluid motor means for moving said torch in the opposite direction against the pressure of the spring.

JAMES L. ANDERSON.